Figure 1:
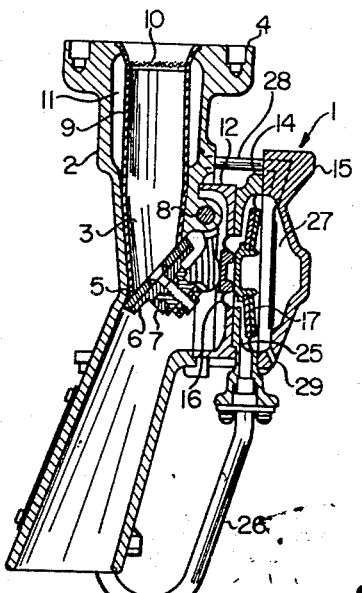

Feb. 2, 1965

R. L. CISCO ETAL 3,168,105

LEVEL CONTROL VALVE

Filed Sept. 27, 1962

2 Sheets-Sheet 1

INVENTORS
RICHARD L. CISCO &
ROGER H. BLANCHARD
BY Oberlin, Maky & Donnelly
ATTORNEYS

United States Patent Office 3,168,105
Patented Feb. 2, 1965

3,168,105
LEVEL CONTROL VALVE
Richard L. Cisco, 23811 Fullmar Ave., Torrance, Calif., and Roger H. Blanchard, 729 S. Barrington Ave., Los Angeles, Calif.
Filed Sept. 27, 1962, Ser. No. 226,711
15 Claims. (Cl. 137—386)

The present invention relates generally as indicated to a level control valve and more particularly to such valve which employs a jet transducer which, at one level of liquid in a tank, transforms the velocity head of a jet stream issuing from a nozzle and impinging on a receiver into a pressure head at the receiver and which, at a different level of the liquid in the tank, has its receiver submerged in the liquid whereby the velocity head of the jet stream is dissipated in the liquid. The differences in the pressure heads at the receiver at these different levels then controls operation of the level control valve.

It is a principal object of this invention to provide a control valve of the character indicated in which the valve, when mounted as on a fuel tank, has a main inlet valve member which is held in closed position until the level of the fuel drops below a predetermined level, at which time a velocity head of a stream of fuel from the inlet port impinging on a receiver is transformed to a pressure head to permit movement of the main inlet valve member to open position by fuel pressure in the inlet port.

It is another object of this invention to provide a jet type level control valve in which the jet assembly, i.e., the jet nozzle, and receiver, are mounted at a desired level in the tank and are so arranged that when the level in the tank reaches the desired level the jet will at least partly be submerged, whereby the aforesaid pressure head is substantially lost so that the main inlet valve is automatically closed.

It is another object of this invention to provide a jet assembly in which the jet is protected from inadvertent submersion as by waves or sloshing of the liquid in the tank as it is being filled.

It is another object of this invention to provide a jet type level control valve having a pressure-seated main inlet valve with strainer means for preventing ice particles and the like, from entering the jet nozzle of the transducer.

It is another object of this invention to provide a jet type level control valve as aforesaid, in which there are provided multiple jet assemblies, two, for example, which assure proper operation of the level control valve even though one assembly is inoperative.

It is another object of this invention to provide a jet type level control valve which is arranged to spread out the levels at which it closes and then reopens whereby to avoid unnecessary cycling thereof.

It is another object of this invention to provide a level control system for a tank-emptying operation arranged so that the level control valve is automatically closed when the level of the liquid reaches a predetermined minimum level.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
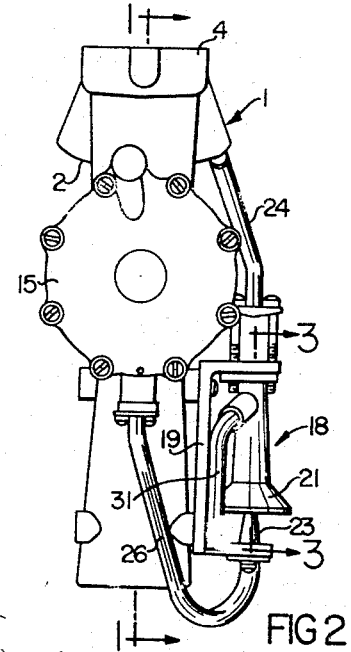
Figure 3:
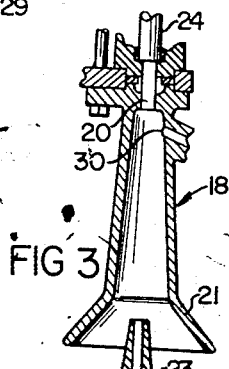
Figure 4:
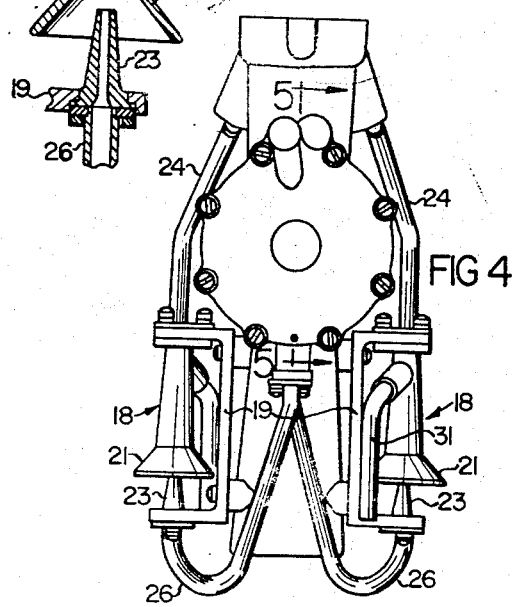
Figure 5:
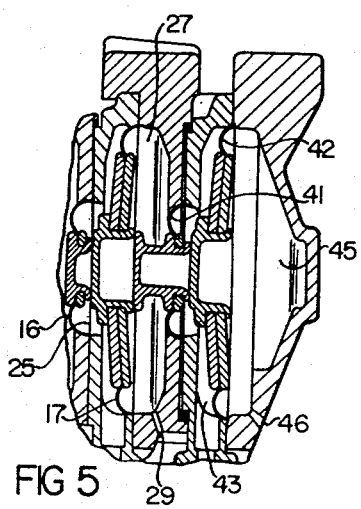
Figure 6:
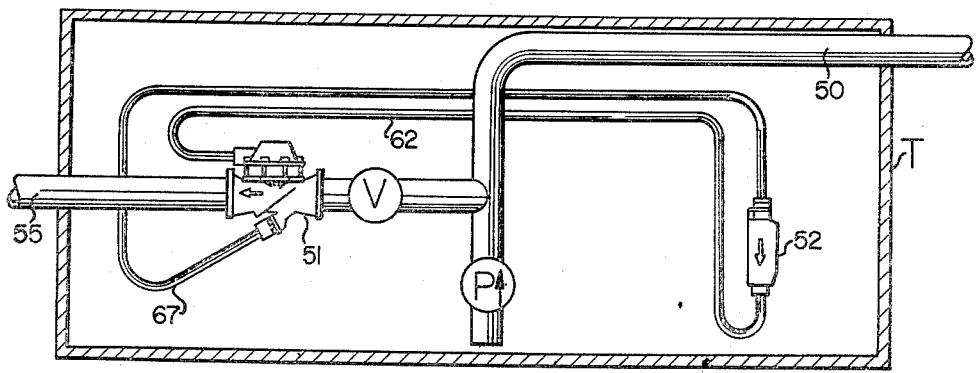
Figure 7:
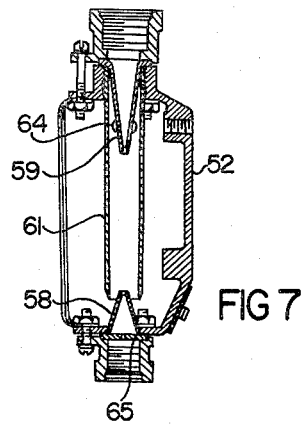
Figure 8:
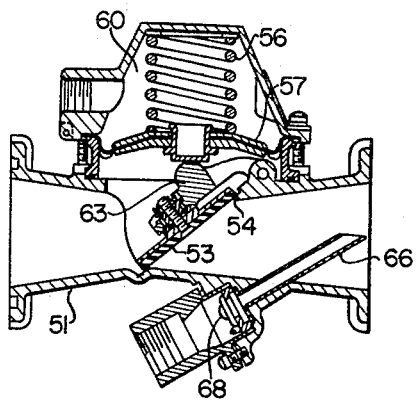

In said annexed drawings:
FIG. 1 is a vertical cross-section view taken substantially along the line 1—1, FIG. 2, illustrating one form of level control valve according to the present invention;
FIG. 2 is an elevation view as viewed from the right-hand side of FIG. 1;
FIG. 3 is a cross-section view, on enlarged scale, taken along line 3—3, FIG. 2;
FIG. 4 is an elevation view similar to FIG. 2 except illustrating a level control valve having duplicate jet assemblies;
FIG. 5 is a fragmentary cross-section view on enlarged scale taken substantially along the line 5—5, FIG. 3;
FIG. 6 is a schematic diagram of a level control system which is operative automatically to discontinue removal of liquid from the tank when it reaches a predetermined minimum level;
FIG. 7 is a central vertical cross-section view of the jet assembly employed in the FIG. 6 system; and
FIG. 8 is a central vertical cross-section view of the outlet valve assembly employed in the FIG. 6 system.

Referring now more particularly to the drawings, and first to FIGS. 1, 2, and 3, the level control valve assembly 1 therein shown, comprises a housing 2 provided with a passage 3 therethrough whereby liquid may be introduced into a tank when, for example, the flanged upper end 4 of the housing 2 is secured to the top or other wall of a tank (not shown).

Between the ends of the passage 3 is a valve seat 5 with which the swing valve member 6 cooperates to stop or permit the flow of liquid into the tank. The valve member 6 is provided with an angular arm 7 which is pivotally mounted on the pin 8 in the housing 2.

The inlet portion of the passage 3 is provided with a plastic liner 9 which tapers toward the valve seat 5 and which has a flared upper end seating in the upper end of the housing 2. This sleeve or liner 9 is preferably made of suitable plastic material such as tetrafluoroethylene, and has an annular array of openings 10 radially through the wall thereof adjacent the flared upper end which are of size to permit flow of liquid therethrough into the chamber 11 surrounding the upper portion of the sleeve but small enough to preclude passages of ice particles which may be present in fuel or like liquid which is being introduced into the tank.

Secured to the side of the housing 2 are rings 12 and 14 and a cap 15, there being clamped between the rings 12 and 14 a first diaphragm assembly 16, the central rigid portion of which is adapted to engage the arm 7 of the valve member 6, and there being clamped between the ring 14 and the cap 15 a second diaphragm assembly 17, the rigid central portion of which is adapted to engage the central portion of diaphragm assembly 16.

Also mounted on the side of the housing 2 is a jet assembly 18 which comprises a bracket 19 of which the top arm carries the jet nozzle 20 and shroud or shield 21, and of which the bottom arm carries the jet receiver 23. The jet nozzle 20 is communicated with the pressure chamber 11 by means of the conduit 24, and the jet receiver 23 is communicated with the chamber 25 between the diaphragms 16 and 17 by means of the conduit 26. The chamber 27 between the diaphragm 17 and the cap 15 is also communicated with the pressure chamber 11 as by a short length of conduit 28 between the boss of the cap 15 and the housing 2, there being an orifice 29 in the cap 15 which opens into the tank for draining any water which might accumulate in chamber 27 over a period of time but which is otherwise small enough in flow capacity to permit build-up of pressure in the chamber 27 to move the central portion of the diaphragm 17 toward the left to engage the diaphragm 16 and, in turn, the latter holds the inlet valve member 6 in engagement with the seat.

In operation, when the tank is to be filled, the fluid pressure source will be communicated with the upper end of the passage 3, whereby the liquid under pressure in the sleeve 9 and in the pressure chamber 11 will establish a vertical jet stream from the nozzle 20 which impinges on the open upper end of the receiver 23 and the receiver 23 will transform the velocity head of the jet to a pressure head. The pressure head thus developed in the chamber 25 tends to move the second diaphragm 17, the larger one, toward the right to decrease, balance out, or overcome the effect of pressure in chamber 27, whereupon the fluid pressure acting on the valve member 6 on the area of the seat 5 will force the valve member 6 out of engagement with the seat 5 for flow of fluid through the outlet passage into the tank. Such force on the valve member 6, of course, overcomes the pressure head in chamber 25 acting on the first small diaphragm 16.

When this level control valve assembly 1 is used in a system where the tank is automatically maintained substantially full, but yet where a reasonable spread or latitude in level is permissible to reduce valve cycling, the upper end of the shield 21 adjacent the nozzle 20 is provided with an opening 30 to which the downwardly extending tube 31 is connected. In the present case, the bottom end of the tube 31 may be located, for example, 2" below the bottom end of shield 21.

The valve member 6 and its clockwise and counterclockwise movements about pin 8, the relative effective areas of the seat 5 and of the diaphragms 16 and 17 are so interrelated to the efficiency of the jet assembly 18 (with jet unsubmerged and submerged) and to the orifice 29 of chamber 27 that the valve member 6 will be opened at the minimum available supply pressure when the jet is unsubmerged and will be closed at the minimum available supply pressure when the jet is submerged. During inverted flight the jet is submerged and the valve member 6 is held closed so that no added weights or springs are required.

The shield 21 is a splash and wave guard and in conjunction with the tube 31 controls the closing and openings levels of the main inlet valve member 6.

Assuming that the level of the liquid in the tank is below the lower end of the tube 31, the velocity head of the jet stream from nozzle 20 to receiver 23 will build up a pressure head, of say 95% of the inlet pressure head, in chamber 25 while there is pressure in chamber 27 whereby the inlet valve member will be forced to open position to allow flow of liquid into the tank. When the level rises to cover the lower end of tube 31, the valve member 6 will yet remain open since the jet stream is clear of the shroud 21. However, when the level rises to cover the lower end of shroud 21, sufficient negative pressure is created at the opening 30 to draw liquid upwardly through tube 31 whereby the shroud 21 will fill up and thereafter flow full. As the shroud starts to fill up with liquid drawn through tube 31, the jet stream from nozzle 20 to receiver 23 will be partially interrupted and the pressure transmitted to chamber 25 through conduit 26 decreased so that main valve 6 starts to close. This causes the pressure at main valve inlet 10 at nozzle 20 to increase so that the jet stream at 20 flows faster and draws a higher vacuum in shield 21 so that liquid will enter shield 21 at a faster rate through tube 31. This causes shield 21 to be completely filled very quickly to complete the submerging or interruption of the jet stream from 20 so that closure of valve 6 is completed. At that time the pressure head in chamber 25 is drastically decreased, to say 25% of the inlet pressure head whereby the pressure in chamber 27 acting on diaphragm 17 is sufficient to hold the valve member 6 against seat 5. Because of the shield 21, main valve 6 will be quickly and positively closed upon the level of the liquid reaching the shield, as described above, and there is no hunting or waivering of the main valve in its closing movement, complete closure being effected within a fraction of a second.

Now, the only flow of liquid into the tank is that through the nozzle 20 and the orifice 29. The shroud 21 continues to flow full even though the level drops below the lower end thereof and it is not until the level falls below the open end of tube 31 that the valve member 6 will be reopened. When the lower end of the tube 31 is uncovered, the vacuum in the shroud 21 is broken, allowing air to be pulled into the shroud 21 and suddenly drops the fuel from therewithin to thereby reestablish the jet and transformation of its velocity head to pressure head at the receiver 23 for opening of the valve member 6. The opening level therefore, is at, or slightly below, the lower end of the tube 31 and, of course, the tube 31 can be longer or shorter to increase or decrease the spread between opening and closing of the valve 1.

A principal use of the level control valve 1 herein is for a non-icing fuel system, that is where icing is a problem and would clog the orifices in a conventional level control valve. In the present case the nozzle orifice 20 may be of relatively large size, for example, .100 to .125 inch diameter, whereas, compared with the conventional level control valve, the nozzle orifice is usually .040 to .050 inch diameter.

As previously mentioned, the inlet tube or sleeve 9 is preferably made of Teflon which provides smooth walls for smooth flow and low pressure drop and is resistant to icing. The row of openings 10 around the upper end of the inlet tube 9 are so small that they will not pass the ice particles which might otherwise block the orifices 20 or 29 but since there are so many openings 10 they have adequate flow capacity.

The level control valve 40 shown in FIGS. 4 and 5 is essentially the same as that shown in FIGS. 1 to 3 except that for foolproof operation there are provided dual jet assemblies 18 in conjunction with two sets of diaphragms 16–17 and 41–42, the receiver tubes 26 leading to the respective chambers 25 and 43 between the sets of first and second diaphragms 16 and 17 and 41 and 42. The chambers 27 and 45 are each communicated with the pressure chamber 11 by tubes 24. Thus, if one of the jet assemblies 18 is inoperative, the other one will effect proper closing of the main inlet valve member 6 and, likewise, if either one of the diaphragms 17 or 42 is ruptured, the remaining one will yet operate to close the main inlet valve member 6 when the desired liquid level is attained. As in the case of chamber 27 having an orifice 29, the chamber 45 has a comparable orifice 46.

In FIG. 6 is shown a level control valve arranged, for example, for dumping or transferring fuel from a fuel tank T down to a predetermined minimum level so that the aircraft may make an emergency landing with minimum fuel load while providing a reasonable amount of fuel for a specified time of operation of the engines. In the system shown in FIG. 6 the valve V is normally closed and the booster pump P draws fuel from the tank T and pumps it through the conduit 50 to the engines.

However, in case of emergency landings it is desired to reduce the fuel load to a minimum and for that purpose there is connected into the fuel pressure line 50 a dump valve assembly, including the valve V, an automatic shutoff valve 51, and a level sensing jet assembly 52. When the valve V is opened for the purpose of dumping excess fuel from the tank T to lessen the fuel load for emergency landing, the fuel under pressure will move the swing valve 53 away from its seat 54 for flow through the dump or transferring line 55, since at that time the fuel pressure is sufficient to overcome the seating influence of the spring 56 of the diaphragm valve actuator 57. At this time, when the liquid level is above the receiver 58 of the jet assembly 52, the jet issuing from the nozzle 59 is dissipated in the liquid, whereby the pressure head in the receiver 58 is relatively low, and thus, the pressure head in the chamber 60 of valve 51 is low. However, when the level of the fuel in the tank T is below the lower end of the shield 61 and the upper end of the receiver 58, the velocity head of the jet from nozzle 59 will impinge on the receiver 58 to cause transformation of the velocity head to a pressure head. The resulting increase in pressure head in the chamber 60 (via conduit 62) together with the influence of the spring 56 will cause the diaphragm 57 to be flexed in a direction such that its center portion bears on the arm 63 of the swing valve 53 to force it to closed position against seat 54, and thus automatically to discontinue the fuel dumping or transferring operation. The jet assembly 52 will be mounted at a level in the tank T as necessary, for example, to keep enough fuel in the tank for a prescribed safe time.

Instead of using the dump line 55 for dumping fuel, it may have a connection to another tank (not shown) so that the latter may be filled from the tank T. The automatic shutoff valve 57 will generally be opened by a relatively low pressure such as 8 p.s.i., or less, so that fuel flow can be maintained through conduit 50 to the engines while the gate valve V is open and while the automatic shutoff valve 51 is open to cause dumping of the fuel.

The shield 61 in the FIG. 7 jet assembly is much the same as that of FIGS. 1 to 4 except herein the nozzle end portion is formed with openings 64 therethrough so that the shield will be drained as the level of the liquid decreases. Moreover, shield 61 protects the jet receiver 58 from splashing or sloshing of the liquid and thus prevents false indication of the level. Also, in FIG. 7 the receiver 58 includes an orifice plate 65 which assists in maintaining a pressure head in the chamber 60 even though the jet stream may be temporarily submerged and, likewise, when the automatic shutoff valve 51 is open it will be gradually closed due to the time lapse for flow of liquid into the chamber 60 through the orifice plate 65 and in this way shocks and rapid pressure variations are avoided. As shown in FIG. 8, the pickup tube 66 which conducts fluid under pressure via conduit 67 to the nozzle 59, has a check valve 68 therein to permit flow of fluid to the nozzle 59.

Although the jet assembly of FIG. 7, for example, is herein shown as being mounted in a vertical position, it is to be understood that it may be mounted in a horizontal position or in a tilted position.

Other modes of applying the principle of the invention may be employed, change being made as regards the details described, provided the features stated in any of the following claims, or the equivalent of such, be employed.

We therefore particularly point out and distinctly claim as our invention:

1. A valve for controlling the level of liquid in a tank comprising a housing having a passage therethrough for flow of liquid; a valve member movable in said housing to open and close said passage; a jet assembly having a nozzle means in communication with said passage upstream of said valve member and a receiver means spaced from said nozzle means upon which a jet of liquid from said nozzle means impinges to transform the velocity head of the jet to different pressure heads according to whether or not the jet is submerged in the liquid in the tank; an actuator means bearing on said valve member and movable in said housing by change in pressure head acting thereon thus to control movement of said valve member to open and close said passage; said actuator means and housing defining a chamber which is in communication with said receiver means and to which chamber such different pressure heads are transmitted to act on said actuator means.

2. The valve of claim 1 wherein said jet assembly has a shield means between said nozzle and receiver operative to protect the jet from inadvertent submersion by waves or sloshing of the liquid in the tank.

3. The valve of claim 1 wherein said jet assembly has a tubular shield means extending between said nozzle means and receiver means and radially spaced around the jet to protect the jet from inadvertent submersion by waves or sloshing of the liquid in the tank.

4. The valve of claim 1 wherein said jet assembly is disposed so that the jet passes substantially vertically from said nozzle means to said receiver means and is unsubmerged or submerged according to the level of liquid in the tank.

5. The valve of claim 1 wherein said valve member and actuator have detachable engagement.

6. The valve of claim 1 wherein said jet assembly has a substantially vertical tubular shield means open at its lower end extending between said nozzle means and receiver means and radially spaced around the jet; and wherein a conduit means has one end communicating interiorly with the upper end of said shield means adjacent said nozzle means, the other end of said conduit means extending to a level lower than the jet and the lower end of said shield means, said conduit means being operative to draw fluid into said shield means to submerge the jet only when the lower ends of both said conduit means and of said shield means are below the liquid level in the tank.

7. The valve of claim 1 wherein another jet assembly and actuator is provided to control said valve member irrespective of inoperability of either jet assembly or either actuator.

8. The valve of claim 1 wherein said housing has a tubular perforate liner therein constituting at least the portion of said passage which is upstream of said valve member and through the perforations of which fluid flows to said nozzle; said liner being of plastic material to provide a smooth interior wall for flow of fluid therethrough.

9. The valve of claim 1 wherein said actuator means is effective when acted upon by an increase in pressure in said chamber, occasioned by the level of liquid in the tank falling below the jet, to move said valve member to close said passage to preclude further flow of liquid from the tank through said valve.

10. A jet assembly for a valve controlling the liquid level in a tank, said assembly comprising support means; a nozzle means and a receiver means mounted in axially aligned, spaced apart relation on said support means, said nozzle means being operative to impinge a jet stream of liquid on said receiver means to build up a higher fluid pressure in said receiver means when said jet stream is unsubmerged in the liquid in the tank than when said jet stream is submerged, said nozzle means being adapted to be communicated with a fluid pressure source, and the different fluid pressures in said receiver means being adapted to be communicated with such valve for controlling operation of the latter; and a shield means between said nozzle means and receiver means to preclude submersion of the jet stream as by sloshing of the liquid in the tank.

11. The jet assembly of claim 10 wherein said shield means is tubular with openings adjacent said nozzle and receiver means; a downwardly extending conduit means communicating at its upper end with the opening adjacent said nozzle means and extending to a level with its lower end below the jet stream and below the opening adjacent said receiver means, said conduit means being operative only when both the lower end thereof is covered by the rising level of liquid in the tank and the opening adjacent said receiver means is covered to create a negative pressure in said shield means for filling thereof and consequent submersion of the jet stream.

12. The jet assembly of claim 11 wherein said shield means is mounted in substantially vertical position with the opening adjacent said receiver means defined by the lower open end of the shield means radially spaced around said receiver means.

13. The jet assembly of claim 12 wherein said shield means is a conical diverging tube operative to flow full due to flow from said nozzle means and from said opening adjacent said nozzle means until after the lower end of said conduit means is uncovered by lowering of the level of the liquid in the tank.

14. The jet assembly of claim 13 wherein said shield means further has increased divergence from a zone above to below the upper end of said receiver.

15. A valve for controlling the level of liquid in a tank comprising a housing having a passage therethrough for flow of liquid; a valve member movable in said housing to open and close said passage; a jet assembly having a nozzle in communication with said passage upstream of said valve member and a receiver spaced from said nozzle upon which a jet of liquid from said nozzle impinges to transform the velocity head of the jet to different pressure heads according to whether or not the jet is submerged in the liquid in the tank; an actuator bearing on said valve member and movable in said housing by change in pressure head acting thereon thus to control movement of said valve member to open and close said passage; said actuator and housing defining a chamber which is in communication with said receiver and to which chamber such different pressure heads are transmitted to act on said actuator, said actuator comprising a first diaphragm engageable with said valve member; a second larger diaphragm engageable with said first diaphragm; said diaphragms defining said chamber therebetween; and said second diaphragm defining another chamber with said housing which has also communication with said passage upstream of said valve member and with restricted communication with the interior of the tank whereby, upon decrease in pressure in the first-mentioned chamber, the pressure in said another chamber urges both diaphragms toward the valve member to move it to close said passage.

References Cited in the file of this patent

UNITED STATES PATENTS

| | | |
|---|---|---|
| 2,528,747 | Gravelle | Nov. 7, 1950 |
| 2,796,090 | Carriol | June 18, 1957 |
| 2,903,025 | Richards | Sept. 8, 1959 |
| 2,942,837 | Bauerlein | June 28, 1960 |
| 3,082,785 | Radway | Mar. 26, 1963 |

FOREIGN PATENTS

| | | |
|---|---|---|
| 313,524 | Switzerland | June 15, 1956 |

UNITED STATES PATENT OFFICE
CERTIFICATE OF CORRECTION

Patent No. 3,168,105                                   February 2, 1965

Richard L. Cisco et al.

It is hereby certified that error appears in the above numbered patent requiring correction and that the said Letters Patent should read as corrected below.

In the grant, lines 1 and 2, for "Richard L. Cisco, of Torrance, California, and Roger H. Blanchard, of Los Angeles, California," read -- Richard L. Cisco, of Torrance, California, and Roger H. Blanchard, of Los Angeles, California, assignors to Parker-Hannifin Corporation, of Cleveland, Ohio, a corporation of Ohio, --; line 11, for "Richard L. Cisco and Roger H. Blanchard, their heirs" read -- Parker-Hannifin Corporation, its successors --; in the heading to the printed specification, lines 3 to 5, for "Richard L. Cisco, 23811 Fullmar Ave., Torrance, Calif., and Roger H. Blanchard, 729 S. Barrington Ave., Los Angeles, Calif." read -- Richard L. Cisco, Torrance, Calif., and Roger H. Blanchard, Los Angeles, Calif., assignors to Parker-Hannifin Corporation, Cleveland, Ohio, a corporation of Ohio --.

Signed and sealed this 22nd day of June 1965.

(SEAL)
Attest:

ERNEST W. SWIDER                             EDWARD J. BRENNER
Attesting Officer                           Commissioner of Patents